US012798797B2

(12) United States Patent
Shao

(10) Patent No.: US 12,798,797 B2
(45) Date of Patent: Nov. 17, 2026

(54) METHODS, SYSTEMS, AND STORAGE MEDIA FOR EMERGENCY SUPERVISION OF DEBRIS FLOWS BASED ON LARGE MODELS OF INTERNET OF THINGS (IoT)

(71) Applicant: CHENGDU QINCHUAN IOT TECHNOLOGY CO., LTD., Chengdu (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/315,449

(22) Filed: Aug. 29, 2025

(65) Prior Publication Data

US 2025/0388345 A1 Dec. 25, 2025

(30) Foreign Application Priority Data

Aug. 13, 2025 (CN) ........................ 202511129731.0

(51) Int. Cl.
*B64U 10/00* (2023.01)
*B64U 101/31* (2023.01)
(Continued)

(52) U.S. Cl.
CPC ........... *B64U 10/00* (2023.01); *G06Q 50/265* (2013.01); *G16Y 20/10* (2020.01); *G16Y 40/10* (2020.01); *B64U 2101/31* (2023.01)

(58) Field of Classification Search
CPC .. B64U 10/00; B64U 2101/31; G06Q 50/265; G06Q 10/0637; G16Y 20/10;
(Continued)

(56) References Cited

FOREIGN PATENT DOCUMENTS

| | | | | |
|---|---|---|---|---|
| CN | 119251988 A | | 1/2025 | |
| CN | 119479242 A | * | 2/2025 | ........... G08B 29/188 |

(Continued)

OTHER PUBLICATIONS

Kannan, N., Martin, D., Srinivasan, R., & Zhang, W. (2024). Adjuvants for Drone-Based Aerial Chemical Applications to Mitigate Off-Target Drift. Drones, 8(11), 667. https://doi.org/10.3390/drones8110667 (Year: 2024).*

(Continued)

*Primary Examiner* — Michael C Zarroli
*Assistant Examiner* — John Martin O'Malley
(74) *Attorney, Agent, or Firm* — PORUS IP LLC

(57) ABSTRACT

Provided are a system and method for emergency supervision of a debris flow based on a large model of IoT. The method includes: dividing a target region into a plurality of sub-regions; at every preset interval, determining enhanced multimodal data of each of the sub-regions based on original multimodal data of each of the sub-regions and a positional relationship between the sub-regions; determining an independent risk value of each of the sub-regions; determining a first risk value of each of the sub-regions based on the independent risk value and the positional relationship; and generating a collection instruction based on the first risk value of each of the sub-regions, a downstream residential density, and the enhanced multimodal data of the sub-regions, and sending the collection instruction to an emergency supervision internal perception control platform to control a UAV to collect data based on the collection instruction.

13 Claims, 4 Drawing Sheets

300

(51) Int. Cl.
*G06Q 50/26* (2024.01)
*G16Y 20/10* (2020.01)
*G16Y 40/10* (2020.01)

(58) Field of Classification Search
CPC ....... G16Y 40/10; G06F 18/15; G06F 18/214; G06F 18/23; G06F 18/25
See application file for complete search history.

(56) References Cited

FOREIGN PATENT DOCUMENTS

| | | | | | |
|---|---|---|---|---|---|
| CN | 119558507 | A | * | 3/2025 | ............. G06N 3/092 |
| CN | 119942735 | A | * | 5/2025 | |
| CN | 120124826 | A | | 6/2025 | |
| CN | 120634324 | A | | 9/2025 | |
| WO | 2023061039 | A1 | | 4/2023 | |
| WO | 2024123170 | A1 | | 6/2024 | |

OTHER PUBLICATIONS

Xu, Xinghua et al., Dynamic Risk Assessment and Mergency Warning for Sudden Geological Disasters in Small Watershed of Southeastern Coastal Mountainous Area, Journal of Catastrophology, 33(4): 78-85&92, 2018.

Kristyna Kolarikova et al., High-Throughput Sequencing Haplotype Analysis Indicates in LRRK2 Gene a Potential Risk Factor for Endemic Parkinsonism in Southeastern Moravia, Czech Republic, Life, 12(121): 1-10, 2022.

First Office Action in Chinese Application No. 202511129731.0 mailed on Sep. 17, 2025, 15 pages.

Decision to Grant a Patent in Chinese Application No. 202511129731.0 mailed on Oct. 13, 2025, 5 pages.

* cited by examiner

200

300

METHODS, SYSTEMS, AND STORAGE MEDIA FOR EMERGENCY SUPERVISION OF DEBRIS FLOWS BASED ON LARGE MODELS OF INTERNET OF THINGS (IoT)

CROSS-REFERENCE TO RELATED APPLICATIONS

This application claims priority to Chinese application No. 202511129731.0, filed on Aug. 13, 2025, the entire contents of which are incorporated herein by reference.

TECHNICAL FIELD

The present disclosure relates to the technical field of mudslide emergency supervision, and in particular relates to a method, a system, and a storage medium for emergency supervision of a debris flow based on a large model of Internet of Things (IoT).

BACKGROUND

As a severe natural disaster, debris flows are characterized by sudden occurrence, high velocity, large discharge, substantial material volume, and strong destructive power, which may cause significant casualties and property damage.

However, the formation and development of debris flows are influenced by multiple interrelated factors. Monitoring only rainfall or displacement alone cannot accurately analyze the complex geological change process, which may lead to low accuracy and timeliness of monitoring results. As a result it is difficult to take effective preventive measures in advance, posing a significant threat to people's lives and property.

Therefore, it is desirable to provide a method and a system for emergency supervision of a debris flow based on a large model of IoT. By conducting multi-dimensional monitoring and performing integrated analysis of monitoring data, the method and the system enable effective monitoring and early warning of debris flow occurrences, providing accurate and reliable risk prevention guidance for relevant authorities and personnel.

SUMMARY

One or more embodiments of the present disclosure provide a system for emergency supervision of a debris flow based on a large model of Internet of Things (IoT). The system includes an emergency supervision user platform, an emergency supervision service platform, an emergency supervision management platform, an emergency supervision sensing network platform, and an emergency supervision perception control platform that sequentially interacts with each other. The emergency supervision user platform includes a government supervision user platform and a citizen user platform, and the emergency supervision perception control platform includes an emergency supervision internal perception control platform and an emergency supervision external perception control platform. The emergency supervision management platform is configured to: divide a target region into a plurality of sub-regions; at every preset interval, determine enhanced multimodal data of each of the plurality of sub-regions based on original multimodal data of each of the plurality of sub-regions and a positional relationship between the plurality of sub-regions; determine an independent risk value of each of the plurality of sub-regions based on the enhanced multimodal data; and determine a first risk value of each of the plurality of sub-regions based on the independent risk value and the positional relationship. The emergency supervision management platform is further configured to: generate a collection instruction based on the first risk value of each of the plurality of sub-regions, a downstream residential density, and the enhanced multimodal data of the plurality of sub-regions, and send the collection instruction to the emergency supervision internal perception control platform to control an unmanned aerial vehicle (UAV) to collect data based on the collection instruction, the collection instruction including a collection path, collection point locations, and collection volumes corresponding to the collection points locations.

One or more embodiments of the present disclosure provide a method for emergency supervision of a debris flow based on a large model of Internet of Things (IoT). The method is executed based on an emergency supervision management platform. The method includes: dividing a target region into a plurality of sub-regions; at every preset interval, determining enhanced multimodal data of each of the plurality of sub-regions based on original multimodal data of each of the plurality of sub-regions and a positional relationship between the plurality of sub-regions; determining an independent risk value of each of the plurality of sub-regions based on the enhanced multimodal data; determining a first risk value of each of the plurality of sub-regions based on the independent risk value and the positional relationship. The method further includes: generating a collection instruction based on the first risk value of each of the plurality of sub-regions, a downstream residential density, and the enhanced multimodal data of the plurality of sub-regions, and sending the collection instruction to the emergency supervision internal perception control platform to control an unmanned aerial vehicle (UAV) to collect data based on the collection instruction, the collection instruction including a collection path, collection point locations, and collection volumes corresponding to the collection point locations.

One or more embodiments of the present disclosure provide a non-transitory computer-readable storage medium storing computer instructions, wherein when reading the computer instructions in the storage medium, a computer implements the method for emergency supervision of a debris flow based on a large model of Internet of Things (IoT) provided in the present disclosure.

BRIEF DESCRIPTION OF THE DRAWINGS

The present disclosure will be further illustrated by way of exemplary embodiments, which will be described in detail through the accompanying drawings. These embodiments are not limiting, and in these embodiments, the same numbering denotes the same structure, wherein.

DETAILED DESCRIPTION

Figure 1:
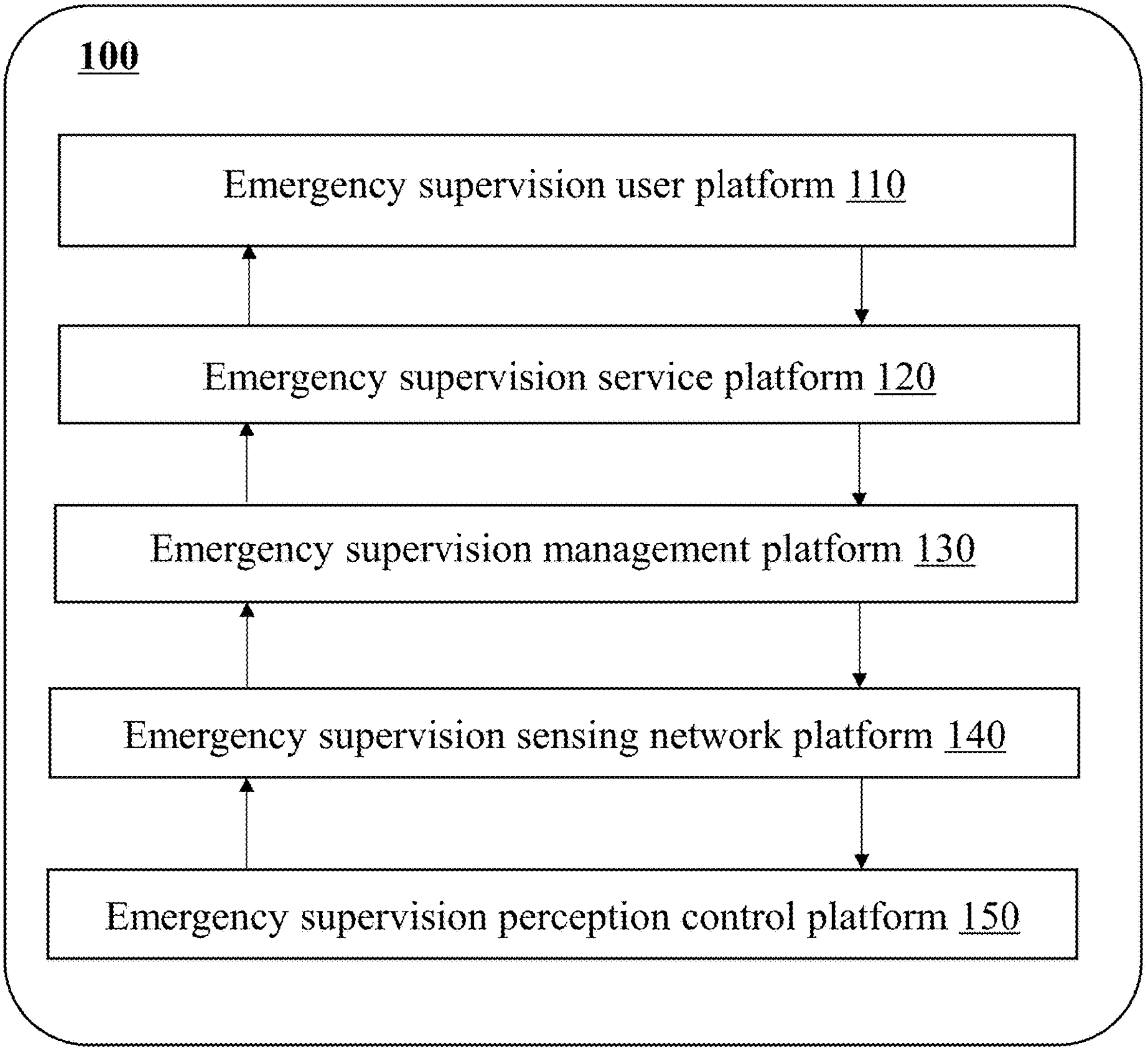
FIG. 1 is a block diagram illustrating an exemplary platform structure of a system for emergency supervision of a debris flow based on a large model of Internet of Things (IoT) according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or", as used herein, is merely a way of describing the associative relationship of an associated object, indicating that three relationships can exist, e.g., A and/or B, which may be represented as: An alone, both A and B, and B alone. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a block diagram illustrating an exemplary platform structure of a system for emergency supervision of a debris flow based on a large model of Internet of Things (IoT) according to some embodiments of the present disclosure.

In some embodiments, as shown in FIG. 1, a system 100 for emergency supervision of a debris flow based on a large model of IoT (also referred to as a debris flow emergency supervision system) includes an emergency supervision user platform 110, an emergency supervision service platform 120, an emergency supervision management platform 130, an emergency supervision sensing network platform 140, and an emergency supervision perception control platform 150 that sequentially interacts with each other.

In some embodiments, the emergency supervision platform 110 includes a government supervision user platform 111 and a citizen user platform 112. The government supervision user platform 111 refers to a platform for a government supervision user to supervise the operation of the entire debris flow emergency supervision system, and the government supervision user may be a person from a safety management department. The citizen user platform 112 refers to a platform for obtaining emergency supervision notifications and warning information.

In some embodiments, the emergency supervision user platform 110 may be a terminal device.

The emergency supervision service platform 120 refers to a platform for providing supervisory needs to a supervisory user.

In some embodiments, the emergency supervision service platform 120 may be configured in a processor and/or a server.

In some embodiments, the emergency supervision service platform 120 interacts upwardly with the emergency supervision user platform 110 and downwardly with the emergency supervision management platform 130.

The emergency supervision management platform 130 refers to a platform configured to coordinate and manage the communication and collaboration among various functional platforms, aggregate all information from the IoT, and provide perception management and control management functions for the operation of the IoT.

In some embodiments, the emergency supervision management platform 130 may be configured in a processor and/or a server. The emergency supervision management platform 130 may include a database. The database is a database for storing regulatory data. For example, the database may be configured to store original multimodal data, an interpolation model, etc.

In some embodiments, the emergency supervision management platform 130 is configured to divide a target region into a plurality of sub-regions; every predetermined period, determine enhanced multimodal data of each of the plurality of sub-regions based on the original multimodal data of each of the plurality of sub-regions and a positional relationship between the plurality of sub-regions; determine an independent risk value of each of the plurality of sub-regions based on the enhanced multimodal data; determine a first risk value of each of the plurality of sub-regions based on the independent risk value and the positional relationship; and generate a collection instruction based on the first risk values of the plurality of sub-regions, a downstream residential density, and the enhanced multimodal data of the plurality of sub-regions, and send the collection instruction to an emergency supervision internal perception control platform 151 to control a UAV to collect data based on the collection instruction.

The emergency supervision sensing network platform 140 refers to a functional platform configured to manage sensing communications. In some embodiments, the emergency supervision sensing network platform 140 is capable of implementing sensing communication for perception information and sensing communication for control information.

In some embodiments, the emergency supervision sensing network platform 140 may be configured as a communication device and/or a gateway.

In some embodiments, the emergency supervision sensing network platform 140 interacts upwardly with the emergency supervision management platform 130 and downwardly with the emergency supervision perception control platform 150.

The emergency supervision perception control platform 150 refers to a functional platform for generating the perception information and executing the control information. In some embodiments, the emergency supervision perception control platform 150 includes the emergency supervision internal perception control platform 151 and an emergency supervision external perception control platform 152.

In some embodiments, the emergency supervision internal perception control platform 151 includes a plurality of sensors disposed in the target region. The plurality of sensors are configured to collect the original multimodal data of the target region. The plurality of sensors include at least one of an image sensor, a rain gauge, an anemometer, a conductivity sensor, a spectrometer, or the like.

In some embodiments, the emergency supervision internal perception control platform 151 further includes an unmanned aerial vehicle (UAV). The UAV is configured to collect data based on the collection instruction, spray a flocculant based on a first spraying instruction, spray the flocculant based on a second spraying instruction, etc.

In some embodiments, the emergency supervision external perception control platform 152 includes a plurality of mutually independent external sensing data interface modules. The external sensing data interface modules are configured to collect correlation data of the target region. The external perception data interface modules include, but are not limited to, a sensing data interface module for weather forecast (for obtaining weather forecast information of the target region from a meteorological department), a sensing data interface module for regional population density (for obtaining a downstream residential density data of the target region from a relevant department such as a civil affairs department), and a sensing data interface module for geologic structure (for obtaining geologic data of the target region from a geologic department), or the like.

Figure 2:
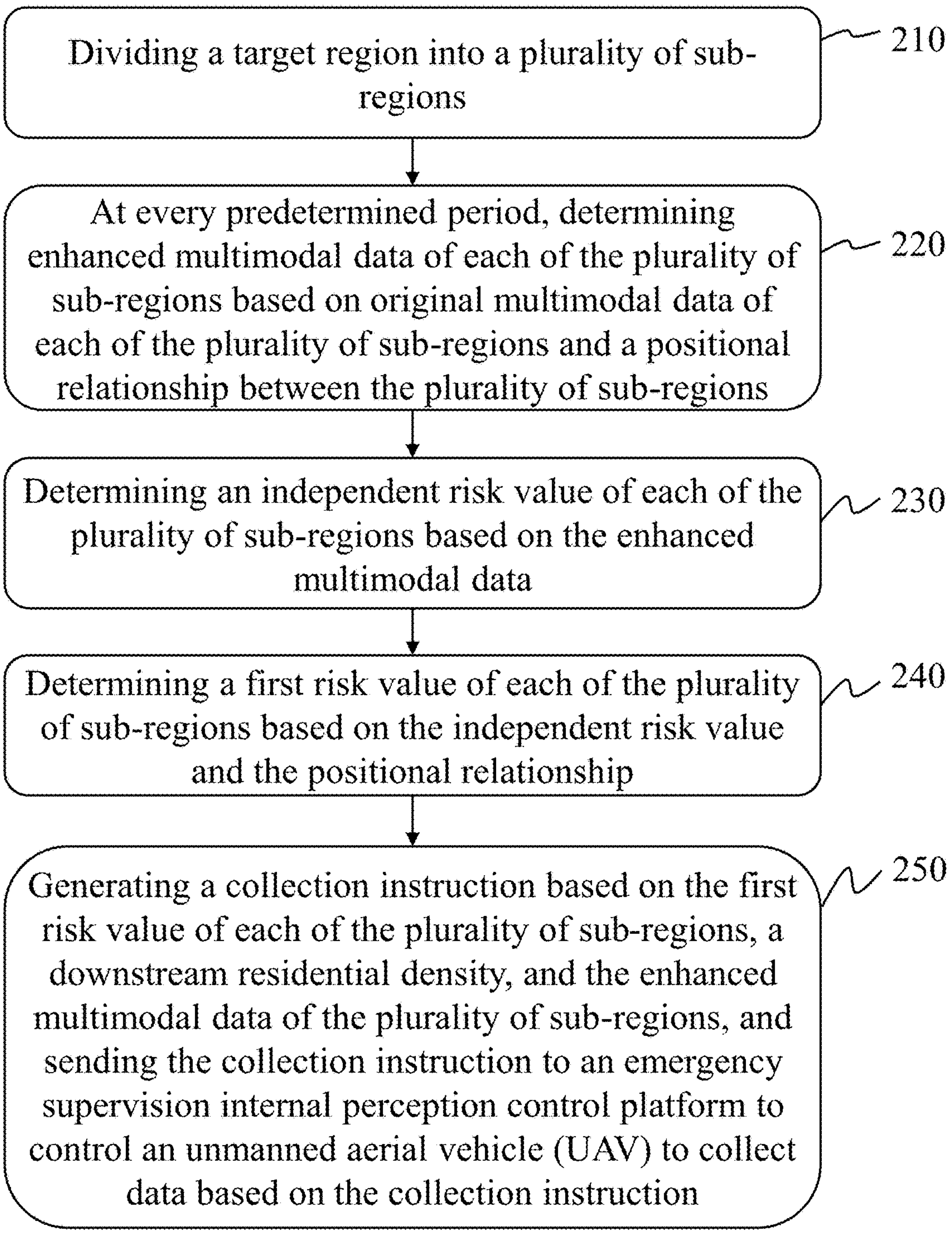
FIG. 2 is a flowchart illustrating an exemplary process for emergency supervision of a debris flow based on a large model of Internet of Things (IoT) according to some embodiments of the present disclosure.
Figure 3:
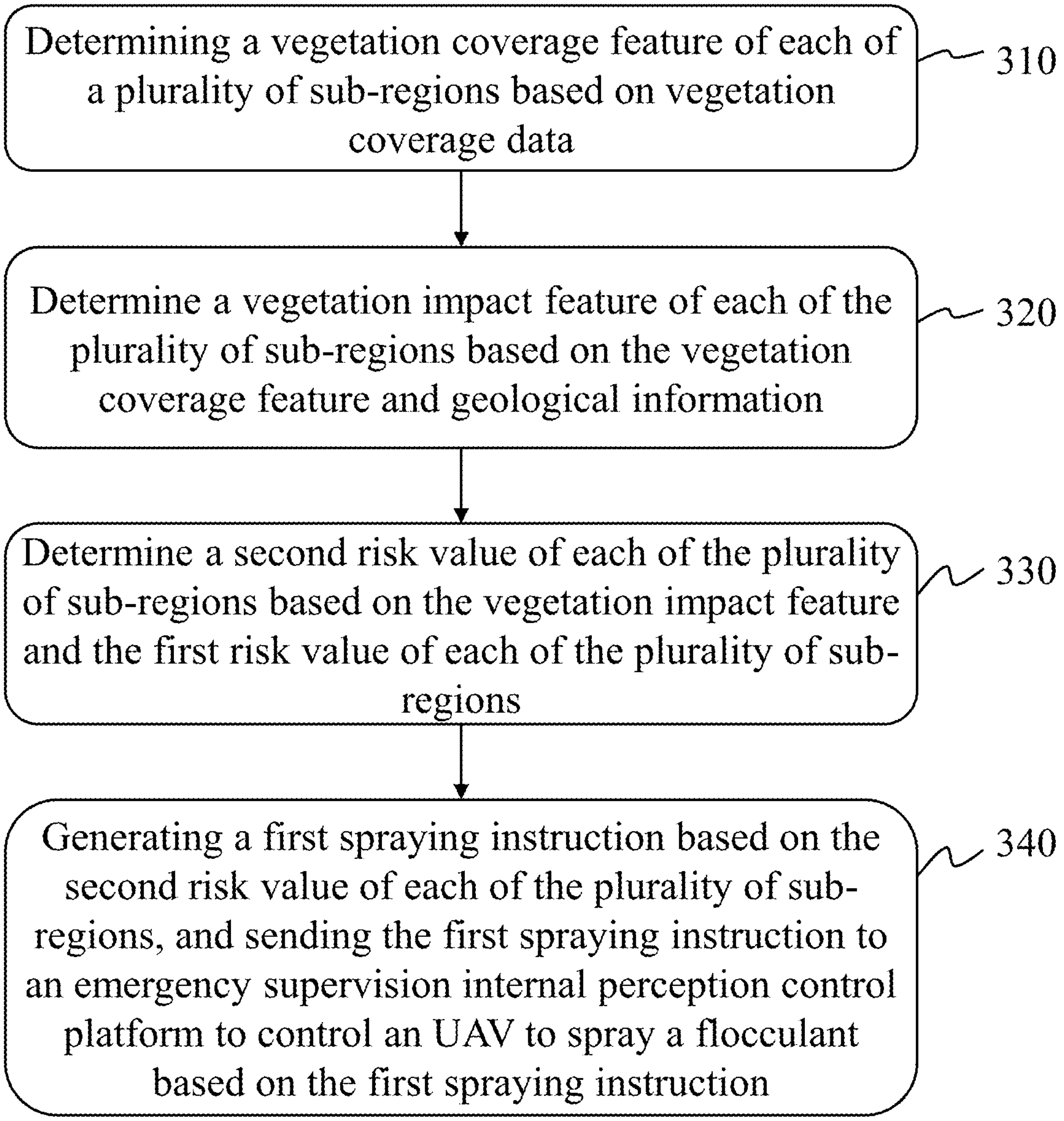
FIG. 3 is schematic diagram illustrating an exemplary process for generating a first spraying instruction according to some embodiments of the present disclosure.
Figure 4:
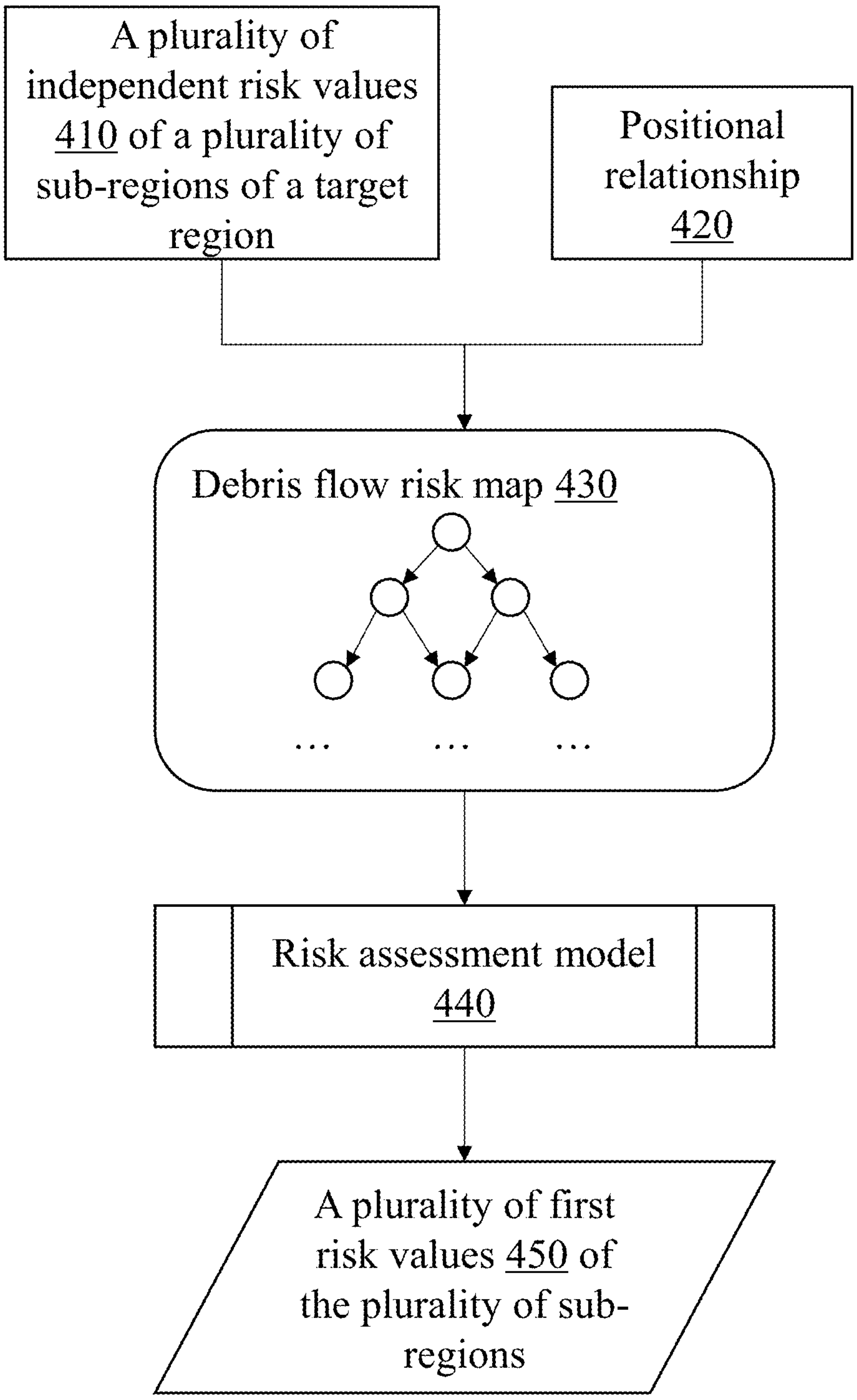
FIG. 4 is schematic diagram illustrating an exemplary risk assessment model according to some embodiments of the present disclosure.

More descriptions of the various platforms of the system 100 may be found in the relevant descriptions of FIGS. 2-4.

In some embodiments of the present disclosure, the debris flow emergency supervision system can form a closed-loop information flow among the various functional platforms, enabling coordinated and orderly operation, and efficiently and accurately estimating the risk of debris flow occurrence in different sub-regions.

It should be noted that the above descriptions of the debris flow emergency supervision system and its platforms are provided only for descriptive convenience, and do not limit the present disclosure to the scope of the cited embodiments. It may be understood that for a person skilled in the art, after understanding the principle of the system, it is possible to arbitrarily combine various platforms or constitute a subsystem to connect with other platforms without departing from this principle.

FIG. 2 is a flowchart illustrating an exemplary process for emergency supervision of a debris flow based on a large model of Internet of Things (IoT) according to some embodiments of the present disclosure. As shown in FIG. 2, process 200 includes the following steps. In some embodiments, process 200 may be executed by an emergency supervision management platform. Step 210, dividing a target region into a plurality of sub-regions.

The target region refers to a region requiring debris flow emergency supervision. For example, the target region may include a valley, a mountain slope, etc.

In some embodiments, the emergency supervision management platform may determine, based on historical data, a region where a debris flow has previously occurred as the target region.

In some embodiments, the emergency supervision management platform may determine, based on empirical evidence, a region with a high probability of debris flow occurrence as the target region. For example, the target region may be a region where a heavy rainfall has occurred.

The target region may also be determined through any other feasible manner.

In some embodiments, the emergency supervision management platform may obtain a topographic map of the target region via the Internet and divide the target region into a plurality of sub-regions based on geographic orientation, elevation, etc. For example, if the target region is a mountain slope, the emergency supervision management platform may divide the mountain slope into sub-regions such as peaks at different orientations (e.g., an eastern peak, a southern peak, a western peak, a northern peak), a mid-slope region, a foothill, or the like.

In some embodiments, the emergency supervision management platform may periodically execute Steps 220 to 250 every preset interval.

In some embodiments, the emergency supervision management platform may set the preset interval based on empirical data. For example, the preset interval may be 5 minutes, 10 minutes, etc.

Step 220, determining enhanced multimodal data of each of the plurality of sub-regions based on original multimodal data of each of the plurality of sub-regions and a positional relationship between the plurality of sub-regions.

The original multimodal data refers to multiple types of unprocessed data associated with the target region.

In some embodiments, the original multimodal data includes multiple types of data corresponding to each of the plurality of sub-regions at multiple time points. The original multimodal data is acquired by an emergency supervision perception control platform from an emergency supervision internal perception control platform and an emergency supervision external perception control platform, and is aggregated and processed by the emergency supervision management platform. For example, the original multimodal data may include geological information, climatic information, and hydrological information of each of the plurality of sub-regions at the multiple time points.

The geological information of a sub-region refers to information related to a composition and a structure of the sub-region's strata. For example, the geological information includes a geological type, a terrain, geomorphological information, etc., of the sub-region.

The climatic information of a sub-region refers to information related to a weather condition in the sub-region. For example, the climatic information includes a rainfall intensity, a wind direction, a wind speed level, etc., in the sub-region The hydrological information of a sub-region refers to information related to a distribution of water in the sub-region. For example, the hydrological information includes a groundwater level, a soil moisture level, etc., in the sub-region.

In some embodiments, the emergency supervision management platform may collect the original multimodal data through a plurality of sensors deployed in the target region. For example, the sensors may include an image sensor, a rain gauge, an anemometer, a conductivity sensor, a spectrometer, etc.

In some embodiments, the original multimodal data further includes plant stress data and stratum data.

The plant stress data refers to data reflecting an impact of environmental changes on plants. For example, the plant stress data of a sub-region includes a physiological signal of an indicator plant in the sub-region.

The indicator plant is a species sensitive to minor soil displacement or moisture variation. For examples the indicator plant includes Oxalis (wood sorrel), *Stellaria media* (chickweed), Juncus effusus (soft rush), or the like.

The physiological signal refers to a signal released during plant growth. For example, the physiological signal includes leaf spectral data.

In some embodiments, the emergency supervision management platform may continuously capture the leaf spectral data of the indicator plant using a hyperspectral camera installed in the target region.

The stratum data refers to subsurface geological data. For example, the stratum data includes seismic data, acoustic data, etc., of the strata.

In some embodiments, the emergency monitoring and management platform may collect the stratum data via a sensing optical cable deployed within the strata.

In some embodiments, monitoring the plant stress data and the stratum data enables detection of minute soil variations, thereby improving the accuracy and timeliness of the emergency supervision of the debris flow.

The positional relationship refers to a relative positional relationship between different sub-regions in space. For example, the positional relationship includes elevation differences between the sub-regions, whether the sub-regions are directly connected, relative orientations between the sub-regions, or the like.

In some embodiments, the emergency supervision management platform may determine the positional relationship of the plurality of sub-regions based on a topographic map of the target region.

In some embodiments, the original multimodal data may lack a certain type of data or data at a certain time point. Therefore, it is necessary to supplement the missing data.

The enhanced multimodal data refers to complete multimodal data after supplementing the missing data in the original multimodal data. The enhanced multimodal data includes comprehensive multimodal data of all types across all time points.

In some embodiments, for each of one or more data-missing sub-regions, the emergency supervision management platform may identify a missing data position in the original multimodal data corresponding to the data-missing sub-region, and supplement the missing data position via linear interpolation.

A data-missing sub-region refers to a sub-region lacking multimodal data. The data missing position refers to a position where multimodal data is missing, including a data missing time point and a data missing data type.

In some embodiments, in response to determining that the data missing position corresponding to a data-missing sub-region includes a data missing time point ti and a data missing data type $\alpha$, the emergency supervision management platform may supplement the data missing position via the linear interpolation based on a plurality of pieces of multimodal data of the data missing type $\alpha$ from time points adjacent to data missing time point ti in the original multimodal data.

In some embodiments, in response to determining that the data missing position corresponding to a data-missing sub-region includes all time points and a data missing type B, the emergency supervision management platform may determine a plurality of adjacent sub-regions of the data-missing sub-region based on the positional relationship, obtain multimodal data of the data missing type $\beta$ across all time points from the plurality of adjacent sub-regions, and supplement the data-missing position via the linear interpolation. A count of pieces of multimodal data and a density of the multimodal data determined via the linear interpolation may be an average count of pieces of multimodal data and an average density of the multimodal data of the data missing type $\beta$ from the plurality of adjacent sub-regions. The density of multimodal data refers to a count of pieces of multimodal data of a certain type per unit of time.

In some embodiments, the emergency supervision management platform may determine the data missing position corresponding to the data-missing sub-region and the plurality of adjacent sub-regions of the data-missing sub-region based on the original multimodal data of the plurality of sub-regions and the positional relationship, and determine the enhanced multimodal data corresponding to the data-missing sub-region through an interpolation model based on original multimodal data corresponding to the data-missing sub-region, the data missing position, and original multimodal data of the plurality of adjacent sub-regions of the data-missing sub-region.

The interpolation model (also referred to as an interpolation large model) is a model configured to determine the enhanced multimodal data through linear interpolation. In some embodiments, the interpolation model is a machine learning model. For example, the interpolation model may be a Neural Network (NN) model, a large model, a user-defined model, or any combination thereof.

An input of the interpolation model includes the original multimodal data corresponding to the data-missing sub-region, the data missing position, and the original multimodal data of the plurality of adjacent sub-regions. An output of the interpolation model includes the enhanced multimodal data corresponding to the data-missing sub-region.

In some embodiments, the emergency supervision management platform may train the interpolation model using a plurality of first training samples with first labels. The emergency supervision management platform may input the first training samples into an initial interpolation model, construct a loss function based on an output of the initial interpolation model and the first labels, and iteratively update parameters of the initial interpolation model based on the loss function. The iteration ends when a stopping condition is met, and the trained interpolation model is obtained. Manners for iterative updates include gradient descent, or the like. The stopping condition may include convergence of the loss function, a count of the iterations reaching a threshold, or the like.

A first training sample includes sample multimodal data corresponding to a sample data-missing sub-region, a sample data missing position, and original multimodal data of a plurality of sample adjacent sub-regions of the sample data-missing sub-region. The first label of a first training sample includes enhanced multimodal data of the sample data-missing sub-region corresponding to the first training sample.

In some embodiments, the emergency supervision management platform may identify a sub-region with complete original multimodal data based on historical data, determine the sub-region as the sample data-missing sub-region, and designate the original multimodal data of the sub-region as the first label. The emergency supervision management platform may then randomly remove multimodal data at one or more positions in the original multimodal data corresponding to the sample data-missing sub-region to obtain the sample multimodal data, where the one or more positions are the sample data missing position(s). The emergency supervision management platform may designate adjacent sub-regions of the sample data-missing sub-region as sample adjacent sub-regions, and obtain the original multimodal data of the plurality of sample adjacent sub-regions.

In some embodiments of the present disclosure, by using the interpolation model to determine the enhanced multimodal data, the missing data in the original multimodal data can be supplemented more accurately and quickly, thereby making an independent risk value subsequently determined based on the enhanced multimodal data more accurate.

In some embodiments, the emergency supervision management platform may sequentially supplement data missing positions corresponding to a plurality of data-missing sub-regions through the aforementioned manner to obtain enhanced multimodal data of each sub-region.

Step 230, determining an independent risk value of each of the plurality of sub-regions based on the enhanced multimodal data.

A risk value of a sub-region is an indicator used to measure a probability of debris flow occurrence in the sub-region. In some embodiments, the risk value may be represented by a numerical value, where a higher value indicates a greater probability of debris flow occurrence.

The independent risk value of a sub-region refers to a risk value determined based on the enhanced multimodal data of the single sub-region.

In some embodiments, the emergency supervision management platform may determine the independent risk value of a sub-region through cluster analysis based on the enhanced multimodal data of the sub-region. For example, the emergency supervision management platform may obtain historical enhanced multimodal data of each of a plurality of sub-regions based on historical data, construct a first clustering vector corresponding to each of the plurality of sub-regions based on the historical enhanced multimodal data of the sub-region, and designate whether a debris flow occurred within a preset period after a time point corresponding to the historical enhanced multimodal data of the sub-region as the label of the first clustering vector corresponding to the sub-region. The emergency supervision management platform may construct a first clustering vector database based on a plurality of first clustering vectors and their corresponding labels.

The emergency supervision management platform may construct a first target vector based on the enhanced multimodal data of a current sub-region, perform clustering using the first target vector and the plurality of first clustering vectors to obtain a plurality of clusters, and identify the cluster containing the first target vector as a first target cluster. The emergency supervision management platform may determine a ratio of a count of first clustering vectors labeled as "debris flow occurred" within the first target cluster to a total count of the first clustering vectors in the first target cluster, and designate the ratio as the independent risk value of the current sub-region. Techniques for clustering include, but are not limited to, a K-Means clustering algorithm, a DBSCAN clustering algorithm, or the like.

Step 240, determining a first risk value of each of the plurality of sub-regions based on the independent risk value and the positional relationship.

The first risk value refers to a risk value determined based on the enhanced multimodal data of a plurality of sub-regions.

In some embodiments, for each of the plurality of sub-regions, the emergency supervision management platform may identify directly adjacent sub-regions of the sub-region based on the positional relationship and determine as an average of the independent risk values of the sub-region and the adjacent sub-regions as the first risk value of the sub-region.

In some embodiments, the emergency supervision management platform may construct a debris flow risk map based on the independent risk values of the plurality of sub-regions and the positional relationship, and determine the first risk values of the plurality of sub-regions through a risk assessment model based on the debris flow risk map, the risk assessment model being a machine learning model. More descriptions may be found in FIG. 4 and related descriptions thereof.

Step 250, generating a collection instruction based on the first risk value of each of the plurality of sub-regions, a downstream residential density, and the enhanced multimodal data of the plurality of sub-regions, and sending the collection instruction to the emergency supervision internal perception control platform to control an unmanned aerial vehicle (UAV) to collect data based on the collection instruction.

The downstream residential density reflects a residential condition in a region located downstream of the target region. For example, the downstream residential density includes a downstream population density, a downstream building distribution density, or the like.

In some embodiments, the emergency supervision management platform may collect images of the region located downstream of the target region via a UAV and determine the downstream residential density by performing image recognition. Image recognition manners include a convolutional neural network, an object detection algorithm, or the like. In some embodiments, the emergency supervision management platform may obtain the downstream residential density from a civil affairs department through the emergency supervision external perception control platform.

The collection instruction refers to an instruction for controlling the UAV to collect data. For example, the collection instruction includes a collection path, collection point locations, and collection volumes corresponding to the collection point locations.

The collection path refers to a movement route of the UAV during data collection. The collection point locations refer to locations where data is collected. The collection volume corresponding to a collection point location refers to an amount of data collected at the point location.

In some embodiments, the emergency supervision management platform may determine the collection path, the collection point locations, and the collection volumes by querying a first preset table based on the first risk value, the downstream residential density, and the enhanced multimodal data.

The first preset table includes a correspondence relationship between first risk values, downstream residential densities, enhanced multimodal data, and collection paths, collection point locations, and collection volumes. The first preset table may be preset by technical personnel based on empirical knowledge.

In some embodiments, the UAV may move according to the collection path and, upon reaching a collection point location, collect data according to the collection volume corresponding to the collection point location.

In some embodiments, the UAV may collect other data relevant to debris flow occurrence. For example, the UAV may collect vegetation coverage data. The emergency supervision management platform may determine a second risk value of each of the plurality of sub-regions based on the vegetation coverage data, generate a first spraying instruction based on the second risk values of the plurality of sub-regions, and send the first spraying instruction to the emergency supervision internal perception control platform to control the UAV to spray a flocculant based on the first spraying instruction. More descriptions regarding the generation of the first spraying instruction may be found in FIG. 3 and related descriptions thereof.

In some embodiments of the present disclosure, by performing multi-dimensional monitoring and conducting fusion analysis of the monitoring data, debris flow development trends can be effectively monitored and predicted, thereby providing accurate and reliable risk prevention and control guidance for relevant departments and personnel. By adjusting UAV data collection parameters based on the first risk values, the flight costs and time required for UAV data collection can be reduced.

FIG. 3 is schematic diagram illustrating an exemplary process for generating a first spraying instruction according to some embodiments of the present disclosure. As shown in FIG. 3, process 300 includes the following steps. In some embodiments, process 300 may be performed by the emergency supervision management platform 130.

Step 310, determining a vegetation coverage feature of each of a plurality of sub-regions based on vegetation coverage data.

The vegetation coverage data refers to image data reflecting a vegetation coverage condition.

In some embodiments, the vegetation coverage data may be collected by a UAV and uploaded to the emergency supervision management platform.

The vegetation coverage feature refers to data reflecting a vegetation distribution and a health status of vegetation. In some embodiments, the vegetation distribution includes a vegetation type, a land coverage area corresponding to the vegetation type, etc. The health status includes whether there are withered or sub-healthy plants and a proportion of such plants, etc.

In some embodiments, the emergency supervision management platform may determine the vegetation coverage feature and a vegetation coverage rate by performing image recognition based on the vegetation coverage data.

Step 320, determining a vegetation impact feature of each of the plurality of sub-regions based on the vegetation coverage feature and geological information.

More descriptions regarding the geological information may be found in step 220 and related descriptions thereof.

The vegetation impact feature refers to data reflecting an impact of vegetation on debris flows. For example, the vegetation impact feature includes an impact value, where a positive impact value indicates that the vegetation exacerbates the debris flow, and a negative impact value indicates that vegetation blocks the debris flow. The greater an absolute value of the impact value is, the greater an exacerbating effect or a blocking effect is.

In some embodiments, the emergency supervision management platform may determine the vegetation impact feature of each of the plurality of sub-regions by performing a cluster analysis based on the vegetation coverage feature and the geological information. For example, the emergency supervision management platform may obtain, based on historical data, historical vegetation coverage features and historical geological information of a plurality of historical sub-regions before a debris flow occurred, and construct a second clustering vector corresponding to each historical sub-region based on the historical vegetation coverage features and the historical geological information. The emergency supervision management platform may determine a flow volume and a flow velocity of the subsequently occurred debris flow as the label corresponding to the second clustering vector, and construct a second clustering vector database based on a plurality of second clustering vectors and their corresponding labels.

The emergency supervision management platform may construct a second target vector based on the vegetation coverage feature and the geological information of a current sub-region, perform clustering based on the second target vector and the plurality of second clustering vectors to obtain a plurality of clusters, and determine a cluster containing the second target vector as a second target cluster.

In some embodiments, for each of the second clustering vectors in the second target cluster, the emergency supervision management platform may determine a difference between the flow volume of the subsequently occurred debris flow corresponding to the second clustering vector and a reference flow volume, and a difference between the flow velocity of the subsequently occurred debris flow corresponding to the second clustering vector and a reference flow velocity. Then the emergency supervision management platform determines a weighted sum of the differences as the impact value corresponding to the second target vector. Weights of the weighted sum may be set based on experience.

The reference flow volume and the reference flow velocity refer to a flow volume and a flow velocity of a debris flow in the absence of vegetation influence.

In some embodiments, the emergency supervision management platform may determine the reference flow volume and the reference flow velocity corresponding to the second clustering vector by querying a second preset table based on the geological information corresponding to the second clustering vector.

The second preset table includes a corresponding relationship between geological information, reference flow volumes, and reference flow velocities, and the second preset table may be set by a technician based on experience.

Step 330, determining a second risk value of each of the plurality of sub-regions based on the vegetation impact feature and the first risk value of each of the plurality of sub-regions.

The second risk value refers to a risk value determined based on the first risk value after considering the vegetation impact feature.

More descriptions regarding the risk value and the first risk value may be found in step 230 and related descriptions thereof.

In some embodiments, the emergency supervision management platform normalizes the impact value and the first risk value, performs a weighted summation on the normalized impact value and the normalized first risk value, and determines a value obtained through the weighted sum as the second risk value. In some embodiments, the normalization manner includes Min-Max normalization or the like.

Step 340, generating the first spraying instruction based on the second risk value of each of the plurality of sub-regions, and sending the first spraying instruction to the emergency supervision internal perception control platform 151 to control the UAV to spray a flocculant based on the first spraying instruction.

The flocculant may cause colloidal particles in the soil to form flocculated precipitates, thereby reducing the mobility of the soil and consequently lowering the risk of debris flow.

The first spraying instruction refers to an instruction for controlling the UAV to spray the flocculant. For example, the first spraying instruction includes a spraying path, first spraying point locations, first spraying volumes corresponding to the first spraying point locations, etc. In some embodiments, the spraying path, the first spraying point locations, and the first spraying volumes may be system-preset values. For example, the spraying path may be an annular path that surrounds the sub-region, and the first spraying point locations may include a plurality of point locations evenly distributed along the spraying path.

In some embodiments, the emergency supervision management platform may determine the spraying path and the first spraying point locations based on geomorphological information and the vegetation coverage data of each sub-region.

The geomorphological information of a sub-region refers to information related to geomorphology of the sub-region. For example, the geomorphological information includes soil looseness levels at different geomorphological locations within the sub-region.

In some embodiments, the emergency supervision management platform may obtain the geomorphological information based on original multimodal data. More descriptions regarding the original multimodal data may be found in step 220 and the related descriptions thereof.

In some embodiments, the emergency supervision management platform may determine, based on the geomorphological information and the vegetation coverage data, a plurality of point locations at which the soil looseness level is greater than a preset looseness threshold or the vegetation coverage rate is less than a preset coverage threshold, and determine the plurality of point locations as the first spraying point locations. The emergency supervision management platform generates the spraying path based on the first spraying point locations through a shortest path planning algorithm or the like. In some embodiments, the shortest path planning algorithm includes, but is not limited to, a Dijkstra algorithm, a Floyd algorithm, or the like.

In some embodiments of the present disclosure, determining the spraying path and the first spraying point locations based on the geomorphological information and the vegetation coverage data, the flocculant can be sprayed to regions where debris flows are likely to occur, thereby effectively improving the spraying effect and reducing the risk of debris flow occurrence.

In some embodiments, in response to determining that the second risk value of a sub-region is greater than a first preset risk threshold, the emergency supervision management platform generates the first spraying instruction and sends the first spraying instruction to the emergency supervision internal perception control platform to control the UAV to move in the sub-region based on the spraying path. When the UAV arrives at a first spraying point location, the flocculant is sprayed in accordance with the first spraying volume corresponding to the first spraying point location.

In some embodiments of the present disclosure, by taking into account the influence of vegetation on the flow velocity and the flow volume of the debris flow, the first risk value is adjusted based on the vegetation impact feature to obtain a more accurate second risk value. When the risk of debris flow occurrence is high, the flocculant may be sprayed using the UAV to reduce the mobility of sediment, thereby decreasing the likelihood of debris flow formation and maximizing the protection of the lives and property of downstream residents.

In some embodiments, in response to a plurality of first risk values of the plurality of sub-regions of the target region not satisfying a predetermined condition, the emergency supervision management platform generates a second spraying instruction simultaneously when generating a collection instruction, and sends the second spraying instruction to the emergency supervision internal perception control platform to control the UAV to spray the flocculant based on the second spraying instruction when the UAV collects data.

The predetermined condition refers to a condition for determining whether to generate the second spraying instruction. In some embodiments, the predetermined condition may be that the plurality of first risk values of the plurality of sub-regions of the target region are all less than a second preset risk threshold. The first preset risk threshold and the second preset risk threshold may be set based on experience.

In some embodiments, the predetermined condition may include a plurality of predetermined sub-conditions, and each of the plurality of sub-regions may correspond to one of the plurality of predetermined sub-conditions. The predetermined sub-condition corresponding to a sub-region may be that the first risk value of the sub-region is less than the corresponding second preset risk threshold.

In some embodiments, the emergency supervision management platform may determine the predetermined sub-condition corresponding to a sub-region based on first risk values of a plurality of adjacent sub-regions of the sub-region. For example, the emergency supervision management platform may determine the second preset risk threshold based on an average value of the first risk values of the plurality of adjacent sub-regions. The larger the average value is, the smaller the second preset risk threshold is.

A debris flow occurring in a sub-region may affect adjacent sub-regions where no debris flow has occurred. In some embodiments of the present disclosure, the second preset risk threshold in the corresponding preset sub-condition of a sub-region is adjusted based on the first risk values of the adjacent sub-regions of the sub-region. This approach can improve the sensitivity of regulation, enabling timely intervention and control of the sub-region, which is beneficial for delaying or preventing the occurrence of debris flows and safeguarding the lives and property of residents.

The second spraying instruction refers to an instruction for controlling the UAV to spray the flocculant during data collection. For example, the second spraying instruction includes second spraying point locations and second spraying volumes corresponding to the second spraying point locations.

In some embodiments, the second spraying point locations may be uniformly distributed along the collection path of the UAV. The second spraying volume may be set based on actual needs.

In some embodiments, the UAV sprays the flocculant at each second spraying point location based on the second spraying volume corresponding to the second spraying point location when the UAV collects data.

In some embodiments of the present disclosure, the emergency supervision management platform controls the UAV to spray the flocculant concurrently during data collection, which can reduce the UAV's flight cost and flight time, effectively improve the timeliness of regulation, and lower the risk of debris flow occurrence.

It should be noted that the above descriptions of process 200 and process 300 are intended to be exemplary and illustrative only and do not limit the scope of application of the present disclosure. For a person skilled in the art, various corrections and changes may be made to the process 200 and the process 300 under the guidance of the present disclosure.

However, these corrections and changes remain within the scope of the present disclosure.

FIG. 4 is schematic diagram illustrating an exemplary risk assessment model according to some embodiments of the present disclosure.

In some embodiments, as shown in FIG. 4, the emergency supervision management platform may construct a debris flow risk map 430 based on independent risk values 410 of a plurality of sub-regions of a target region and a positional relationship 420, and determine first risk values 450 of the plurality of sub-regions through a risk assessment model 440 based on the debris flow risk map 430.

More descriptions regarding the independent risk values, the positional relationship, and the first risk values may be found in FIG. 2 and related descriptions thereof.

The debris flow risk map refers to a map reflecting a risk of debris flow occurrence in each sub-region. The debris flow risk map may be a directed graph and includes a plurality of nodes and a plurality of edges connecting the plurality of nodes.

Each node in the debris flow risk map corresponds to one sub-region. A node feature of a node may be the independent risk value of the sub-region corresponding to the node.

The edges in the debris flow risk map are configured to indicate the positional relationship between the nodes. For example, if sub-regions corresponding to two nodes are adjacent sub-regions, the two nodes are connected by an edge, and the direction of the edge is from an upstream node pointing to a downstream node, i.e., from the node corresponding to the sub-region with a relatively high elevation the node corresponding to the sub-region with a relatively low elevation. In some embodiments, the edges have corresponding edge features. The edge feature of an edge includes an elevation difference of the sub-regions corresponding to two nodes connected by the edge.

In some embodiments, the emergency supervision management platform may determine the elevation difference between two adjacent sub-regions based on the positional relationship. More descriptions regarding the positional relationship may be found in step 220 and related descriptions thereof.

The risk assessment model (also referred to as a risk assessment large model) refers to a model configured to assess the first risk value corresponding to each node in a debris flow risk map. In some embodiments, the risk assessment model is a machine learning model. For example, the risk assessment model is a Graph Neural Network (GNN) model, a large model, a user-defined model, or the like, or any combination thereof.

An input of the risk assessment model includes the debris flow risk map. An output of the risk assessment model include the first risk value corresponding to each node in the debris flow risk map.

In some embodiments, the emergency supervision management platform may obtain the risk assessment model through training based on a plurality of second training samples with second labels. The training manner of the risk assessment model is similar to the training manner of the interpolation model, more descriptions of the training manner may be found in the related descriptions of step 220.

The second training samples include a plurality of historical debris flow risk maps corresponding to different historical target regions, and the second training samples may be obtained based on historical data. The second labels include the first risk value corresponding to each node in the historical debris flow risk maps.

In some embodiments, a historical debris flow risk map corresponds to a plurality of different historical time points. For each of the nodes in the historical debris flow risk map, the emergency supervision management platform may determine, based on historical data, whether a debris flow occurred at the node in a predetermined time period after each of the plurality of historical time points, and determine a ratio of a count of historical time points at which debris flow occurred to a total count of historical time points as the first risk value corresponding to the node.

In some embodiments, the debris flow risk map further includes a plurality of edge weights corresponding to a plurality of edges. The emergency supervision management platform may determine a plurality of debris flow movement features corresponding to the plurality of sub-regions based on geomorphological information, geological information, and surface runoff information, and determine the plurality of edge weights based on the plurality of debris flow movement features and the positional relationship.

More descriptions regarding the geological information may be found in FIG. 2 and related descriptions thereof. More descriptions regarding the geomorphological information may be found in FIG. 3 and related descriptions thereof.

The surface runoff information refers to information related to water flow on a land surface. For example, the surface runoff information includes locations and flow directions of rivers, streams, or the like on the land surface.

In some embodiments, the emergency supervision management platform may collect an image of the target region by the UAV, and determine the surface runoff information through image recognition.

The debris flow movement feature refers to a feature associated with the movement of a debris flow when the debris flow occurs. For example, the debris flow movement feature includes a flow direction (e.g., southeast, southwest, etc.) of the debris flow.

In some embodiments, the emergency supervision management platform may determine the plurality of debris flow movement features corresponding to the plurality of sub-regions by performing a cluster analysis based on the geomorphological information, the geological information, and the surface runoff information. For example, the emergency supervision management platform may construct a plurality of third clustering vectors corresponding to a plurality of historical sub-regions based on the geomorphological information, the geological information, and the surface runoff information of the plurality of historical sub-regions obtained from historical data, determine a historical flow direction of a debris flow occurring in the historical sub-region corresponding to each of the plurality of third clustering vectors as a label corresponding to the third clustering vector, and construct a third clustering vector database based on the plurality of third clustering vectors and their corresponding labels.

The emergency supervision management platform may construct a third target vector based on the geomorphological information, the geological information, and the surface runoff information of a current sub-region, performing clustering based on the third target vector and the plurality of third clustering vectors to obtain a plurality of clusters, and determine a cluster containing the third target vector as a third target cluster. The emergency supervision management platform may take a union of the labels corresponding to all third clustering vectors in the third target cluster, and determine the union as the debris flow movement feature corresponding to the current sub-region.

The edge weight of an edge reflects a probability of a debris flow that occurs at an upstream node of the edge flowing toward a downstream node. The larger the edge weight is, the greater the probability of the debris flow that occurs at the upstream node (e.g., a sub-region 1) of the edge flowing toward the downstream node (e.g., an adjacent sub-region 2 of the sub-region 1).

In some embodiments, in response to determining that the debris flow movement feature corresponding to the upstream node (e.g., the sub-region 1) includes a debris flow direction pointing from the upstream node to the downstream node (e.g., the adjacent sub-region 2), the emergency supervision management platform sets the edge weight of the edge pointing from the upstream node (e.g., the sub-region 1) to the downstream node (e.g., the adjacent sub-region 2) to a high value. In response to determining that the debris flow movement feature corresponding to the upstream node (e.g., the sub-region 1) does not include a debris flow direction pointing from the upstream node to the downstream node (e.g., an adjacent sub-region 3), the emergency supervision management platform sets the edge weight of the edge pointing from the upstream node (e.g., the sub-region 1) to the downstream node (e.g., the adjacent sub-region 3) to a low value. The values of the edge weights may be configured based on requirements.

In some embodiments of the present disclosure, by determining the edge weights in the debris flow risk map, the emergency supervision management platform can take into account the influence of debris flow occurring in upstream nodes on downstream nodes, thereby making the first risk values determined by the risk evaluation model more accurate.

In some embodiments of the present disclosure, by constructing the debris flow risk map and using the risk assessment model, the emergency supervision management platform can quickly and accurately determine the first risk values corresponding to all sub-regions, improving data processing efficiency and accuracy.

Some embodiments of the present disclosure provide an apparatus for emergency supervision of a debris flow based on a large model of IoT. The apparatus includes at least one processor and at least one storage device. The at least one storage device is configured to store computer instructions. The at least one processor is configured to execute at least a portion of the computer instructions to implement the method for emergency supervision of a debris flow based on a large model of IoT described in the present disclosure.

Some embodiments of the present disclosure provide a non-transitory computer-readable storage medium storing computer instructions. When reading the computer instructions in the storage medium, a computer implements the method for emergency supervision of a debris flow based on a large model of IoT described in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A system for emergency supervision of a debris flow based on a large model of Internet of Things (IoT), comprising an emergency supervision management platform configured to:

divide a target region into a plurality of sub-regions;

at every preset interval, determine enhanced multimodal data of each of the plurality of sub-regions based on original multimodal data of each of the plurality of sub-regions and a positional relationship between the plurality of sub-regions, wherein the original multimodal data includes plant stress data and stratum data, and the plant stress data refers to data reflecting an impact of environmental changes on plants;

determine an independent risk value of each of the plurality of sub-regions based on the enhanced multimodal data;

determine a first risk value of each of the plurality of sub-regions based on the independent risk value and the positional relationship including:

for each of the plurality of sub-regions, identifying directly adjacent sub-regions of the sub-region based on the positional relationship, and determining an average of independent risk values of the sub-region and the directly adjacent sub-regions as the first risk value of the sub-region;

determine a vegetation coverage feature of each of the plurality of sub-regions based on vegetation coverage data;

determine a vegetation impact feature of each of the plurality of sub-regions based on the vegetation coverage feature and geological information;

determine a second risk value of each of the plurality of sub-regions based on the vegetation impact feature and the first risk value of each of the plurality of sub-regions;

generate a spraying instruction based on the second risk value of each of the plurality of sub-regions, and send the spraying instruction to an emergency supervision internal perception control platform to control an unmanned aerial vehicle (UAV) to spray a flocculant based on the spraying instruction, the spraying instruction including a spraying path, spraying point locations, and spraying volumes, wherein the spraying path and the spraying point locations are determined based on geomorphological information of each of the plurality of sub-regions and the vegetation coverage data; and generate a collection instruction based on the first risk value of each of the plurality of sub-regions, a downstream residential density, and the enhanced multimodal data, and send the collection instruction to the emergency supervision internal perception control platform to control the unmanned aerial vehicle (UAV) to collect data based on the collection instruction, the collection instruction including a collection path, collection point locations, and collection volumes.

2. The system of claim 1, wherein the emergency supervision management platform is further configured to:

determine a data missing position corresponding to a data-missing sub-region and a plurality of adjacent sub-regions of the data-missing sub-region based on the original multimodal data of the plurality of sub-regions and the positional relationship; and determine enhanced multimodal data corresponding to the data-missing sub-region through an interpolation model based on original multimodal data corresponding to the data-missing sub-region, the data missing position, and original multimodal data of the plurality of adjacent sub-regions of the data-missing sub-region, the interpolation model being a machine learning model.

3. The system of claim 1, wherein the emergency supervision management platform is further configured to:

in response to a plurality of first risk values of the plurality of sub-regions not satisfying a predetermined condition, generate a second spraying instruction simultaneously when generating the collection instruction, and send the second spraying instruction to the emergency supervision internal perception control platform to control the UAV to spray the flocculant based on the second spraying instruction when the UAV collects the data, the second spraying instruction including second spraying point locations and second spraying volumes corresponding to the second spraying point locations.

4. The system of claim 3, wherein the emergency supervision management platform is further configured to:

determine, for each of the plurality of sub-regions, a predetermined sub-condition corresponding to the sub-region based on first risk values of a plurality of adjacent sub-regions of the sub-region.

5. The system of claim 1, wherein the emergency supervision management platform is further configured to:

construct a debris flow risk map based on a plurality of independent risk values of the plurality of sub-regions and the positional relationship; and determine a plurality of first risk values of the plurality of sub-regions through a risk assessment model based on the debris flow risk map, the risk assessment model being a machine learning model.

6. The system of claim 5, wherein the debris flow risk map includes a plurality of edge weights corresponding to a plurality of edges, and the emergency supervision management platform is further configured to:

determine a plurality of debris flow movement features corresponding to the plurality of sub-regions based on the geomorphological information, the geological information, and surface runoff information; and determine the plurality of edge weights based on the plurality of debris flow movement features and the positional relationship.

7. A method for emergency supervision of a debris flow based on a large model of Internet of Things (IOT), the method being executed based on an emergency supervision management platform, and the method comprising:

dividing a target region into a plurality of sub-regions;

at every preset interval, determining enhanced multimodal data of each of the plurality of sub-regions based on original multimodal data of each of the plurality of sub-regions and a positional relationship between the plurality of sub-regions, wherein the original multimodal data includes plant stress data and stratum data, and the plant stress data refers to data reflecting an impact of environmental changes on plants;

determining an independent risk value of each of the plurality of sub-regions based on the enhanced multimodal data;

determining a first risk value of each of the plurality of sub-regions based on the independent risk value and the positional relationship, including:

for each of the plurality of sub-regions, identifying directly adjacent sub-regions of the sub-region based on the positional relationship, and determining an average of independent risk values of the sub-region and the directly adjacent sub-regions as the first risk value of the sub-region;

determining a vegetation coverage feature of each of the plurality of sub-regions based on vegetation coverage data;

determining a vegetation impact feature of each of the plurality of sub-regions based on the vegetation coverage feature and geological information;

determining a second risk value of each of the plurality of sub-regions based on the vegetation impact feature and the first risk value of each of the plurality of sub-regions;

generating a spraying instruction based on the second risk value of each of the plurality of sub-regions, and sending the spraying instruction to an emergency supervision internal perception control platform to control an unmanned aerial vehicle (UAV) to spray a flocculant based on the spraying instruction, the spraying instruction including a spraying path, spraying point locations, and spraying volumes, wherein the spraying path and the spraying point locations are determined based on geomorphological information of each of the plurality of sub-regions and the vegetation coverage data; and generating a collection instruction based on the first risk value of each of the plurality of sub-regions, a downstream residential density, and the enhanced multimodal data, and sending the collection instruction to the emergency supervision internal perception control platform to control the unmanned aerial vehicle (UAV) to collect data based on the collection instruction, the collection instruction including a collection path, collection point locations, and collection volumes.

8. The method of claim 7, wherein the determining enhanced multimodal data of each of the plurality of sub-regions based on original multimodal data of each of the plurality of sub-regions and a positional relationship between the plurality of sub-regions includes:

determining a data missing position corresponding to a data-missing sub-region and a plurality of adjacent sub-regions of the data-missing sub-region based on the original multimodal data of the plurality of sub-regions and the positional relationship; and determining enhanced multimodal data corresponding to the data-missing sub-region through an interpolation model based on original multimodal data corresponding to the data-missing sub-region, the data missing position, and original multimodal data of the plurality of adjacent sub-regions of the data-missing sub-region, the interpolation model being a machine learning model.

9. The method of claim 7, further comprising:

in response to a plurality of first risk values of the plurality of sub-regions not satisfying a predetermined condition, generating a second spraying instruction simultaneously when generating the collection instruction, and sending the second spraying instruction to the emergency supervision internal perception control platform to control the UAV to spray the flocculant based on the second spraying instruction when the UAV collects the data, the second spraying instruction including second spraying point locations and second spraying volumes corresponding to the second spraying point locations.

10. The method of claim 9, further comprising:

determining, for each of the plurality of sub-regions, a predetermined sub-condition corresponding to the sub-region based on a plurality of first risk values of a plurality of adjacent sub-regions of the sub-region.

11. The method of claim 7, wherein the determining a first risk value of each of the plurality of sub-regions based on the independent risk value and the positional relationship includes:

constructing a debris flow risk map based on a plurality of independent risk values of the plurality of sub-regions and the positional relationship; and determining a plurality of first risk values of the plurality of sub-regions through a risk assessment model based on the debris flow risk map, the risk assessment model being a machine learning model.

12. The method of claim 11, wherein the debris flow risk map includes a plurality of edge weights corresponding to a plurality of edges, and the method further comprises:

determining a plurality of debris flow movement features corresponding to the plurality of sub-regions based on the geomorphological information, the geological information, and surface runoff information; and determining the plurality of edge weights based on the plurality of debris flow movement features and the positional relationship.

13. A non-transitory computer-readable storage medium storing computer instructions, wherein when reading the computer instructions in the storage medium, a computer implements the method for emergency supervision of a debris flow based on a large model of Internet of Things (IoT) according to claim 7.

* * * * *